United States Patent [19]

Hanson et al.

[11] 3,715,747

[45] Feb. 6, 1973

[54] CAPACITIVE KEYBOARD ELECTRONICS

[75] Inventors: Charles Christian Hanson, Rochester; Joseph Ping Liong Ho, Byron; Merle Edward Houdek, Rochester, all of Minn.

[73] Assignee: International Business Machines Corporation, Armonk, N.Y.

[22] Filed: Dec. 30, 1971

[21] Appl. No.: 214,196

[52] U.S. Cl...340/365 E, 340/146.1 AB, 340/365 C, 178/17 C

[51] Int. Cl...............................................H04q 3/00

[58] Field of Search.340/365 E, 146.1 AB; 178/17 C

[56] References Cited

UNITED STATES PATENTS

| | | | |
|---|---|---|---|
| 3,456,077 | 7/1969 | Jones, Jr. | 340/365 E |
| 3,631,473 | 12/1971 | Yakata et al. | 340/365 E |

*Primary Examiner*—Donald J. Yusko
*Assistant Examiner*—Robert J. Mooney
*Attorney*—Robert W. Lahtinen et al.

[57] ABSTRACT

In a keyboard, key actuation causes a signal to be coupled from a drive pad to a sense pad. The output from the sense pad is connected to the encoder by a switching circuit. The encoder output goes to both the keyboard data register and through a delay circuit to set a latch which interrupts the switching circuit that was initiated by key depression. Effectively the elapsed time of the delay circuit represents the duration of coupling between the circuit of a depressed key and the data register through the encoding circuits. An overrun condition causes the transmission from encoder to keyboard data register to be inhibited. Although the keyboard is not physically locked by an overrun condition, an audible sound, which occurs upon each key actuation that results in data being received by the keyboard data register, is interrupted to inform the operator that entry of the coded data into such register has not been effected.

8 Claims, 4 Drawing Figures

CAPACITIVE KEYBOARD ELECTRONICS

BACKGROUND OF THE INVENTION

In a data processing system, the operation most prone to error is the initial manual operation whereby information is entered. Using key entry devices, one form of error condition is brought about by multiple key operation which causes the entry of an invalid or erroneous character. One method to overcome such difficulty is to lock out all keys except the key being depressed. This solution, though adequate to prevent multiple key depression is not usually acceptable since it tends to inhibit or impair the effectiveness of a high speed operator.

The keyboard should accommodate successive key depressions at any conceivable rate of operation and should further accept multiple key depression, entering the character data in the sequence in which the character keys are depressed. Concurrently, provision must be made to assure that the data keyed has been accepted by the associated device or system without the occurrence of an overrun condition.

The device of the present invention utilizes an electronic switching circuit which connects the key through the encoder to the data register and a latch which is set to interrupt the switching circuit to effectively disconnect the key from encoder and register circuits. This occurs at a speed many times that of the fastest operator. Also data will be accepted from any number of keys held down concurrently and recorded in the sequence in which the keys were depressed. An overrun condition is signaled when the receiving system or apparatus fails to accept data from the data register and reset the registers prior to receipt of the next successive encoded data.

Also, a high speed operator should be made aware of any overrun or error condition in such manner as will not interfere with normal work habits. Although provided with a visual display, operators seldom visually observe the input and some even turn the display device off. The usual practice is for the operator to continually observe the source documentation while keying.

In the present apparatus, a provision is made for a click or audible sound each time a key is depressed which successfully causes data to be entered into the data register. When an overrun occurs, the key depression does not produce a sound. The operator can then determine what error condition has occurred and what data has been correctly entered.

It is an object of this invention to provide an improved high speed keyboard entry device that accommodates multiple key depression. It is a further object of this invention to provide a keyboard entry device that does not require the visual attention of the operator.

Other features and advantages of the present invention will become apparent from a consideration of the following detailed description when taken in conjunction with the accompanying drawings.

BRIEF DESCRIPTION OF THE DRAWINGS

FIG. 1 including FIG. 1A

DETAILED DESCRIPTION

Figures 1A, 2, 3:
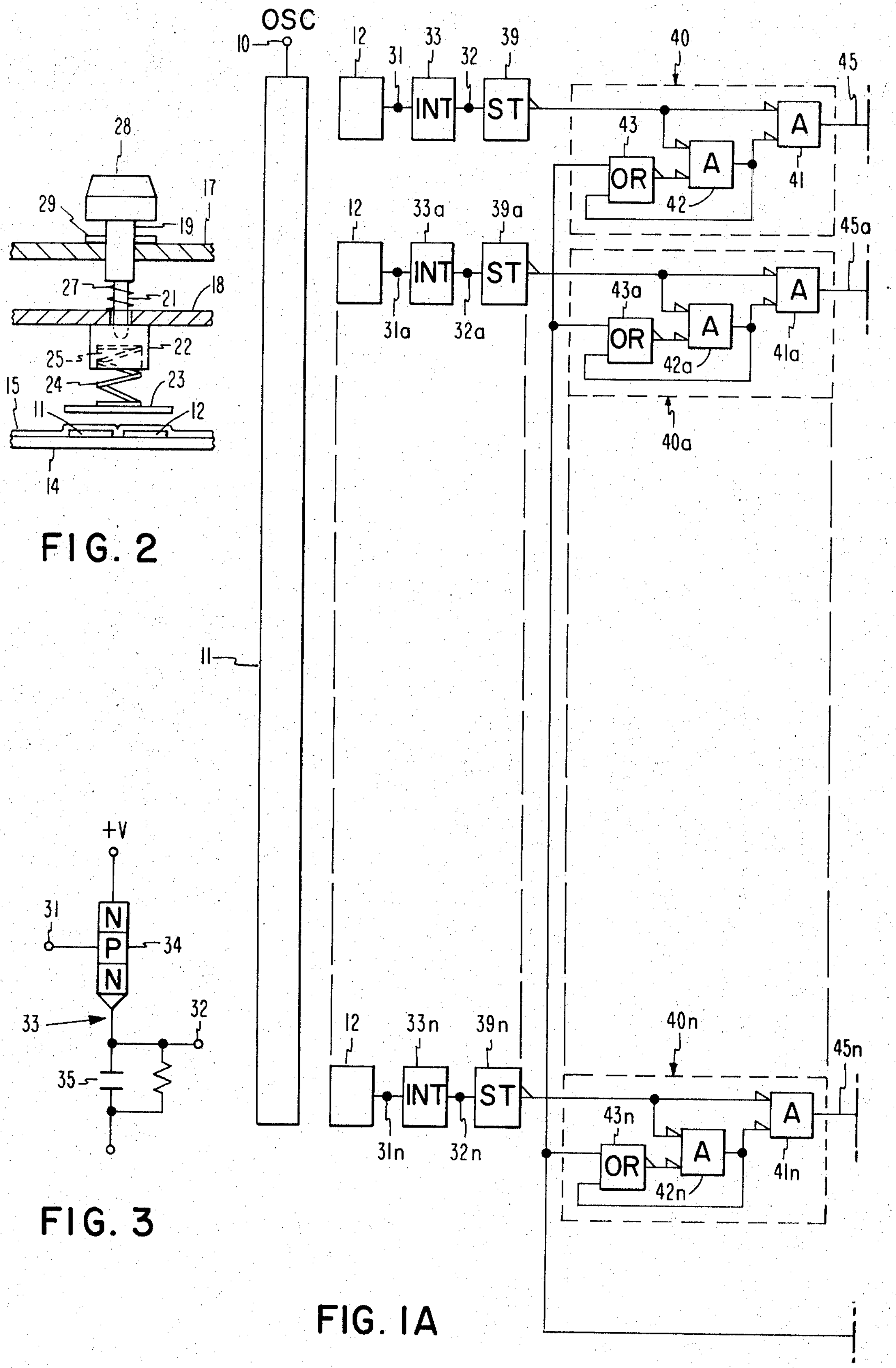
FIG. 2 is a side elevation partly in section and partly in phantom view of a keystem mechanism for selectively capacitively coupling a drive pad to a sense pad.
FIG. 3 shows the circuit of one of the integrators of FIG. 1A.
Figure 1B:
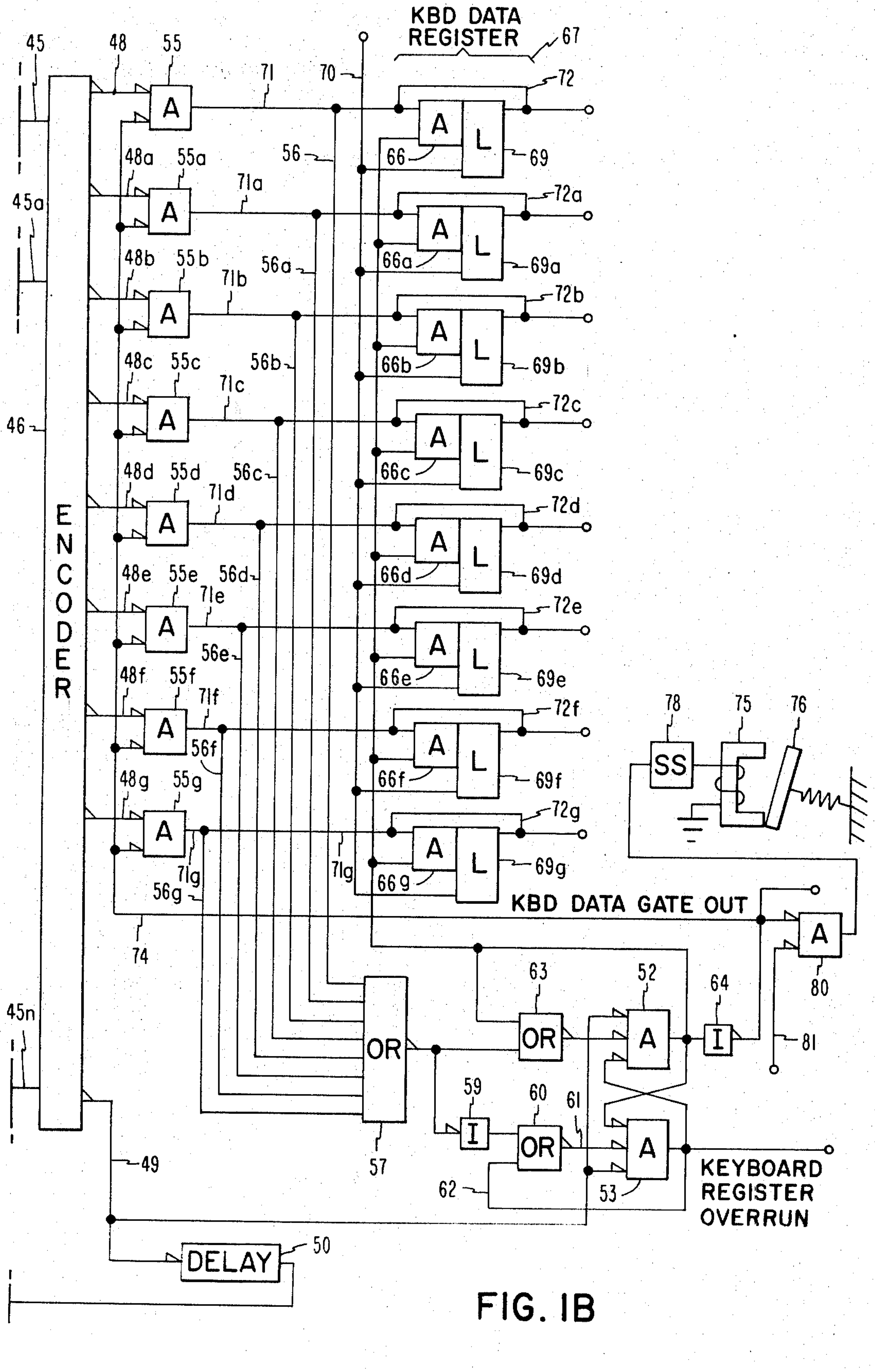
FIG. 1B shows the circuit of the keyboard of the present invention.

Referring to FIGS. 1A and 1B, an oscillator connected to terminal 10 supplies a signal to a drive pad 11. Adjoining drive pad 11 are a series of sense pads 12 which are selectively capacitively coupled to the adjoining drive pad by individual keystem assemblies as shown in FIG. 2. Drive pad 11 and sense pads 12 are plated on a substrate 14 to form a portion of a printed circuit board which is provided with a mylar coating 15 that provides insulation and separation from plate 23 when the latter is depressed. The keystem assembly is carried by a pair of fixed aligned plates 17 and 18. The upper stem 19 is journaled through an opening in alignment plate 17 at its larger diameter portion and has a smaller depending diameter portion 21 projecting through and journaled within the lower alignment plate 18. Lower stem portion 22 receives and is secured to the terminal depending end portion of upper stem 19. The conductive plate 23 is secured to the lower end of spring 24. Spring 24 has the upper end secured to the lower keystem 22 within recess 25. A spring 27 surrounds the reduced diameter portion 21 of the upper keystem 19 and extends between lower alignment plate 18 and the downwardly facing radial surface of the enlarged diameter portion of the upper keystem assembly. Pressing down on key cap 28 until the cap abutts the elastomer stop 29 against the biasing force of spring 27 causes the plate 23 to come into contact with the upper surface of the mylar coating 15 in confronting relation to the drive pad 11 and sense pad 12 to cause the signal supplied to terminal 10 by the oscillator to be coupled capacitively from drive pad 11 to sense pad 12 through the plate 23.

The output signal from the sense pad 12 is applied to the base of amplifier transistor 34. Transistor 34 rectifies the input signal such that positive current pulses are applied to capacitor 35, amplifying the current pulses so that lower impedance loads can be applied to the output. The base to emitter junction of transistor 34 acts as a zener diode to recharge the coupling capacitor during the negative cycle of the oscillator. Further the base to collector junction will forward bias and clamp the output at 32 to a maximum voltage of plus V when a large coupling capacitance is formed. Capacitor 35 provides a DC output level when depression of the associated key is sensed and resistor 37 provides a path to discharge the capacitor when the key is released.

The output of integrator 33 is applied to Schmitt trigger 39 which generates a negative output to condition AND 41 and thereby initiate an output from switching circuit 40. Switching circuit 40 includes AND 41, AND 42 and OR 43. The negative output of Schmitt trigger 39 causes an output on line 45 to effect connection of the signal to encoder 46. The output of Schmitt trigger 39 conditions one input to AND 41 and termination of such output effects reset of the latch composed of AND 42 and 43. The lack of a second negative input to AND 42 causes the output of AND 42 to be negative, thereby satisfying AND 41. The output of switching circuit 40 on line 45 is received by the encoder 46 which causes a selected combination of lines 48 to be conditioned in accordance with the code of the associated depressed key. Each input to the encoder also conditions line 49 causing the latch composed of AND 42 and OR 43 to be set. Satisfying AND 42 causes a positive output which deconditions AND 41 and terminates the output on line 45. The output of AND 42 is also directed to the input of OR 43 to cause the latch to remain set for the duration of the period for which the associated key is held down. Accordingly, the output of switching circuit 40 is connected to the encoder 46 for a duration essentially equivalent to the length of the delay 50. A representative value of delay which is used in practice is 30 microseconds.

Actuation of one of the switching circuits 40 through **40*n* causes encoder 46 to activate one or more of the lines 48 in accordance with the code associated with the switching circuit that has been activated. The negative output of the encoder on line 49 also serves to condition one of the inputs on each of ANDs 52 and 53. A negative output from either AND 52 or 53 respectively conditions an input to the other of the ANDs 52 and 53. The output on any one or more of lines 56 through 56*g* which sense the presence of signals on lines 72 through 72*g* respectively are connected to OR 57. A signal on any of lines 56 through 56*g* indicates that data is present in the corresponding latch 69 through 69*g* of data register 67. A positive condition on any of the lines connected to the input of OR 57 causes a negative output which is inverted to inverter 59 to satisfy OR 60 causing a negative output to condition input 61 to AND 53. The feedback line 62 from the output of AND 53 to the input of OR 60 continues to satisfy input 61 for the duration of the time during which AND 53 is satisfied. If none of the inputs to OR 57 are sensed as active, the positive output to OR 63 causes a negative input to AND 52 whereupon the output of AND 52 through inverter 64 is directed to satisfy the negative input requirements of ANDs 55 through 55*g* and is also directed as a feedback loop to maintain OR 63 in a satisfied condition and also to condition ANDs 66 through 66*g* which form a portion of the keyboard data register 67**.

With the output of AND 52 conditioning the ANDs 66 through **66*g* at the input of keyboard data register latches 69 through 69*g*, the output of ANDs 55 through 55*g* will respectively set the corresponding keyboard data register latches. When the data imparted to thy keyboard data register has been received by the unit or control device that receives the data from the keyboard, such device issues a command on line 70 which resets the latches 69 and 69*g* in data register 67**.

In addition, when a signal on selected lines 48 successfully conditions corresponding ANDS 55 through **55*g* to provide an output on corresponding lines 71, the corresponding ANDS 66 are partially satisfied. The other input line to ANDS 66 through 66*g* is conditioned by the positive output of AND 52. The output of AND 52 also partially conditions AND 80 which also has a normally negative input line 81. Satisfaction of AND 80 activates a single shot 78 to energize a coil causing an armature 76 to be attracted to a core 75 whereupon an audible sound occurs. Line 81** is provided to enable other error conditions to prevent generation of the audible sound.

When any one of the latches 69 through **69*g* of keyboard data register 67 is set, the corresponding feedback loop 72 causes OR 57 to be satisfied and the input 61 to AND 53 to be conditioned. Accordingly, when any latch of keyboard data register 67 is set, a signal on line 49 initiated by a key depression causes an output from AND 53 indicative of a keyboard register overrun. When the keyboard data register 67 is prepared to accept data, a key depression couples the oscillator connected to terminal 10 to activate one of the switching circuits 40 through 40*n*, whereupon encoder 46 causes a negative output on selected lines 48, in accordance with the code of the character key depressed. An output on corresponding lines 48 conditions respective ANDS 55 through 55*g* causing a positive output on line 71 to condition the correspondingly selected ANDS 66 through 66*g* which serve to set the associated latches 69 through 69*g* in the keyboard data register 67**.

An electromagnet 75 is arranged to attract an armature 76 when actuated. Armature 76, normally biased to an open position, is attracted to the core of magnet 75 each time the latter is energized by an output from single shot 78 to thereby generate an audible clock. Single shot 78 is energized by the output of AND 80. Line 81 is normally negative to condition one input of AND 80, consequently magnet 75 is normally actuated each time an output occurs on line 74 indicative of a character key depression and entry of the encoded data into the data register 67. Line 81 provides for an interruption of the audible response as a consequence of an error condition other than an overrun of the data register 67.

In operation, depression of a character key causes a signal to be coupled from drive pad 11 to the sense pad 12 corresponding to the character key. The output from sense pad 12 causes the corresponding switching circuit 40 through **40*n* to be activated, providing an output which is encoded by encoder 46 and entered into data register 67 in the absence of an overrun condition. The signal from drive pad 11 is coupled through encoder 46 to the corresponding latches of data register 67 for a period of sufficient duration to effect entry of encoded data in register 67. This period is determined by delay 50 which establishes the period of time between encoder output and termination of the activation of selected switching circuit 40 through 40*n*. Thereafter the character key is effectively disconnected from encoder 46**. Accordingly, with a time duration of 30 microseconds provided for entering encoded data, the keyboard is prepared to accept and encode data from successive key depressions each 30 microseconds whether or not other keys remain depressed.

While the invention has been particularly shown and described with reference to a preferred embodiment thereof, it will be understood by those skilled in the art that various changes in form and details may be made therein without departing from the spirit and scope of the invention.

What is claimed is:

1. An electronic keyboard apparatus comprising;

a signal source;

a sense pad;

encoding means for receiving the output from said sense pad;

connecting means for interconnecting the output of said sense pad with said encoding means;

key operated means for selectively coupling said signal source to said sense pad upon actuation thereof;

said connecting means including a switching circuit conditioned to initiate a signal to said encoding means upon receipt of a signal from said sense pad; and second connecting means connected to the output of said encoding means and to said switching circuit to decondition said switching circuit upon the occurrence of a signal received from the output of said encoding means, said second connecting means including delay means in series therewith, whereby the duration of interconnection between said encoding means and said sense pad is determined.

2. The keyboard apparatus of claim 1 wherein said key operated means comprises a keystem operated capacitive coupling of said signal source to said sense pad.

3. The keyboard apparatus of claim 2 wherein said switching circuit includes a latch which is reset by the termination of an output signal from said sense pad and set by a signal received from said second connecting means.

4. The keyboard apparatus of claim 3 further comprising data register means connected to the encoded output of said encoding means; and sensing means connected to detect an overrun condition at said data register means upon the occurrence of an output from said encoding means;

said sensing means having an output which inhibits communication between said encoding means and said data register means when an overrun condition is detected.

5. The keyboard apparatus of claim 4 further comprising audible means connected to normally generate an audible sound in response to each key depression and means to suppress generation of said audible sound when said sensing means detects the occurrence of an overrun condition.

6. An electronic keyboard apparatus comprising:

a signal source;

encoding means;

data register means connected to receive and store encoded data from said encoding means;

manually operable means for connecting said signal source to said encoding means;

connecting means from the output of said encoding to said manually operable means;

said connecting means including delay means in series therewith; and said connecting means operatively connected to said manually operable means to electrically disconnect said signal source from said encoding means upon receipt of an output signal from said encoding means.

7. The electronic keyboard apparatus of claim 6 further comprising audible means for issuing an audible sound responsive to each operation of said manually operable means which couples said signal source to said data register means.

8. The electronic keyboard apparatus of claim 7 further comprising disabling means for interrupting communication between said encoding means and said data register means upon actuation of said manually operable means when data is stored in said data register means, said disabling means also functioning to disable said audible means upon actuation of said manually operable means when data is stored in said data register means.

* * * * *